Patented Apr. 13, 1926.

1,580,332

UNITED STATES PATENT OFFICE.

GEORGE C. RICHARDS, OF BERKELEY, CALIFORNIA, ASSIGNOR OF ONE-EIGHTH TO CHARLES J. GRAFF AND ONE-EIGHTH TO EDWARD CHILDRESS, BOTH OF OAKLAND, CALIFORNIA.

INSECTICIDE.

No Drawing. Application filed September 2, 1924. Serial No. 735,482.

*To all whom it may concern:*

Be it known that I, GEORGE C. RICHARDS, a citizen of the United States, residing at Berkeley, county of Alameda, and State of California, have invented new and useful Improvements in Insecticides, of which the following is a specification.

This invention relates to a plastic composition for application to the trunks and limbs of trees, and particularly to a plastic composition of this character which serves the function of an insecticide.

The object of the present invention is to produce a plastic composition, to be applied to the trunks and limbs of trees, to serve the function of an insecticide.

My composition consists of a mixture of pine tar, a fatty substance to serve as a thinner for the pine tar, and in addition thereto a small amount of sulphur and carbolic acid. In preparing the composition I prefer to use the ingredients in about the following proportions, to-wit: 10 gallons of pine tar; 10 gallons of fatty substance, either in the form of animal grease or vegetable oil; 10 pounds of sulphur, and 1 pint of carbolic acid. Good results may be obtained, however, when the fatty substance is increased or decreased; that is, it is sometimes advisable to employ a thinner solution and in that case the amount of grease or oil employed is increased.

The ingredients are mixed in the following manner: The pine tar is heated in a receptacle to a temperature of, say, 150° F. or just sufficient to render it thin. The grease or vegetable oil employed is heated in a separate receptacle to substantially the same temperature and the sulphur and carbolic acid are then added to the grease or oil, and the three substances are thoroughly mixed. The grease or oil, together with the sulphur and carbolic acid mixed therewith, is then poured into the pine tar and the whole is thoroughly mixed by stirring or agitation. The material is then permitted to cool and may be put in cans or other containers for sale.

The composition is employed as follows: It is removed from the receptacle in which it is purchased, unless this be a tin-can. It is then heated just sufficient to render the composition fluid. It may then be applied to the trees by means of a paint brush or the like. The composition is intended as an insecticide. Actual experience has shown that it readily cures cuts, bruises and sunburn, and that it stops rotting of the wood when started. Experience has also shown that it destroys most forms of scale, such as apple scale, San Jose scale, and that it also destroys boring worms and the like. It is also effective when applied to the roots of trees, and when smeared around the base of the trees it prevents insects from crawling up into the trees. The composition may be applied cold, but it is preferable to apply it warm, as it is more easily handled and will more readily penetrate the pores and recesses of the bark of the trees.

Having thus described my invention, what I claim and desire to secure by Letters Patent is—

1. An insecticide paint comprising a composition of pine tar, a thinner for the tar, sulphur and carbolic acid.

2. An insecticide paint comprising a composition of pine tar, a fatty oil, sulphur and carbolic acid.

3. An insecticide paint comprising a composition of pine tar and a fatty oil in substantially equal proportions, a less amount of sulphur and a still less amount of carbolic acid.

GEORGE C. RICHARDS.